United States Patent [19]
Woolaway, II et al.

[11] Patent Number: 5,563,405
[45] Date of Patent: Oct. 8, 1996

[54] STARING IR-FPA WITH ON-FPA ADAPTIVE DYNAMIC RANGE CONTROL ELECTRONICS

[75] Inventors: James T. Woolaway, II, Goleta; Joseph A. Spagnolia, Ventura; William H. Frye, Goleta, all of Calif.

[73] Assignee: Santa Barbara Research Center, Goleta, Calif.

[21] Appl. No.: 430,780

[22] Filed: Apr. 28, 1995

[51] Int. Cl.⁶ .................................................... H01L 27/00
[52] U.S. Cl. ...................... 250/208.1; 250/332; 250/216
[58] Field of Search ................................ 250/208.1, 216, 250/332, 338.1, 214 R; 327/51, 52; 348/164, 169, 301

[56] References Cited

U.S. PATENT DOCUMENTS

| | | | |
|---|---|---|---|
| 4,220,967 | 9/1980 | Ichida et al. | 358/105 |
| 4,382,187 | 5/1983 | Fraleux et al. | 250/208.1 |
| 4,786,831 | 11/1988 | Morse et al. | 307/490 |
| 4,956,716 | 9/1990 | Hewitt et al. | 358/213.27 |
| 4,975,864 | 12/1990 | Sendall et al. | 364/571.01 |
| 4,978,872 | 12/1990 | Morse et al. | 307/490 |
| 5,323,334 | 6/1994 | Meyers et al. | 364/571.01 |
| 5,391,873 | 2/1995 | Cuthbertson | 250/332 |

*Primary Examiner*—Stephone Allen
*Attorney, Agent, or Firm*—W. C. Schubert; W. K. Denson-Low

[57] ABSTRACT

An adaptive dynamic range control circuit architecture is disclosed that enables an IR-FPA (10) to achieve a higher dynamic range. The circuit architecture significantly reduces a resolution required for an analog-to-digital converter (ADC 24) that converts the analog output signals of the IR-FPA to a digital representation. In a preferred embodiment of this invention a column CTIA readout integrated circuit architecture is used in conjunction with the adaptive feedback circuitry of this invention to provide pedestal suppression on a per-pixel basis for the IR-FPA. The use of the circuitry of this invention modifies the conventional column CTIA amplifier configuration to a configuration having an auto-zeroed charge ratioed gain stage (50). One advantage to this technique is that by suppressing the charge pedestal, the usable signal output from the IR-FPA can be brought off-chip to the readout integrated circuit at a much higher gain. As a result, the ADC requires fewer bits to resolve the useable signal information and dynamic range.

15 Claims, 8 Drawing Sheets

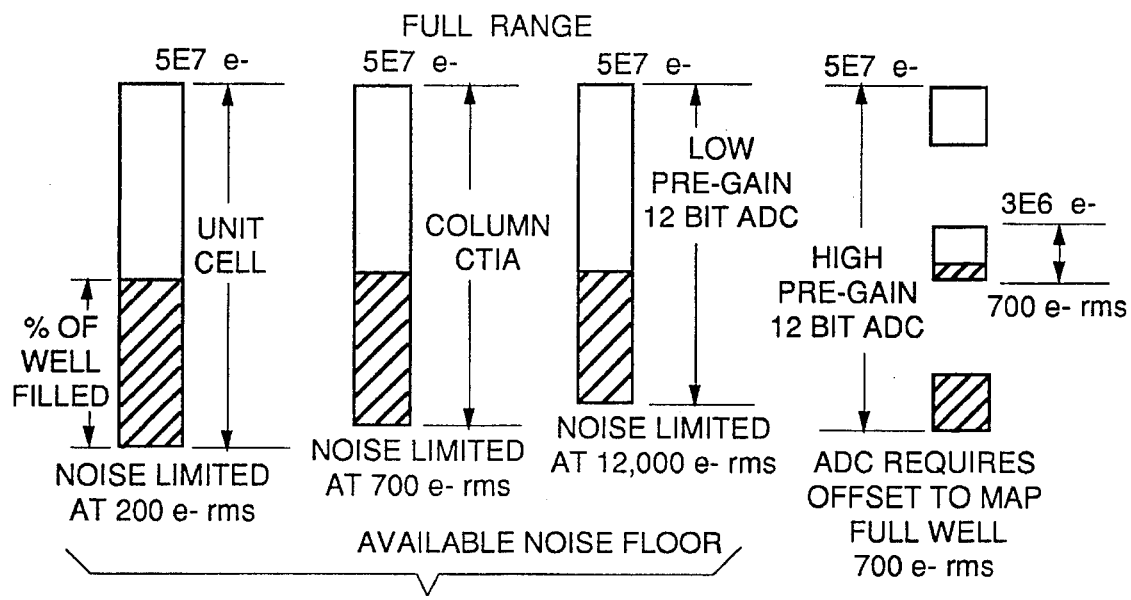
FIG. 1A.
(PRIOR ART)
FIG. 1B.
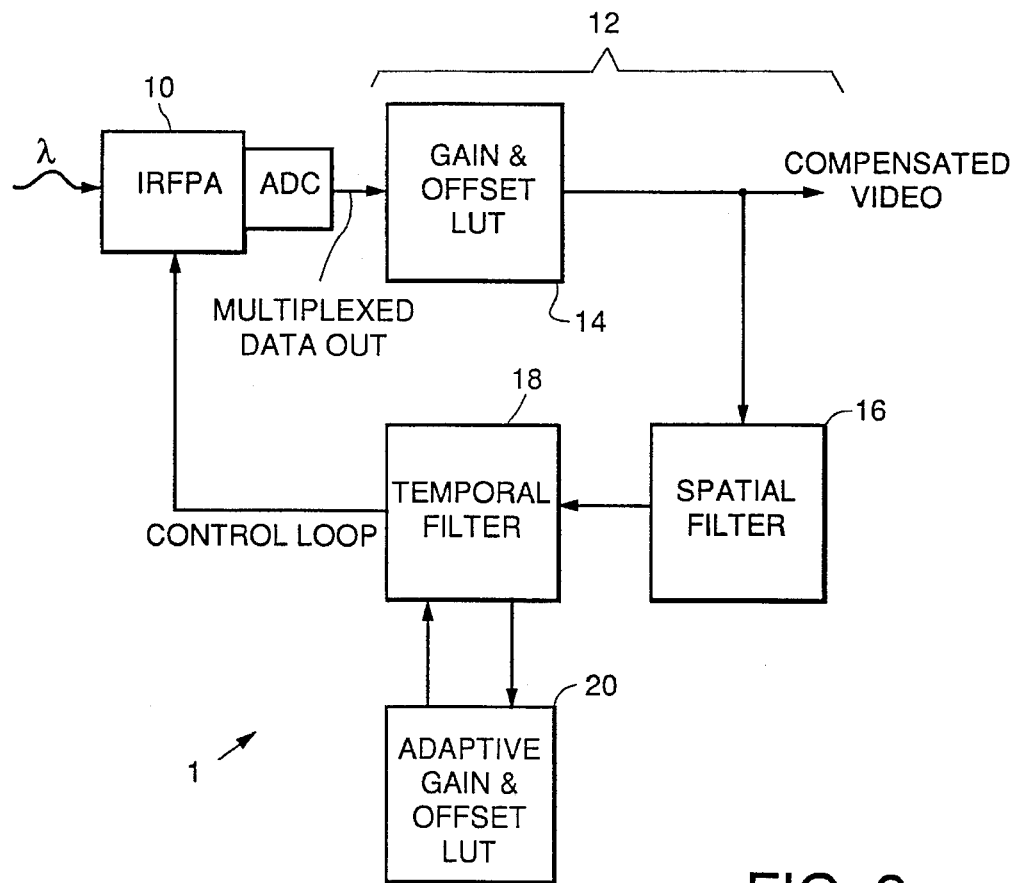
FIG. 2.

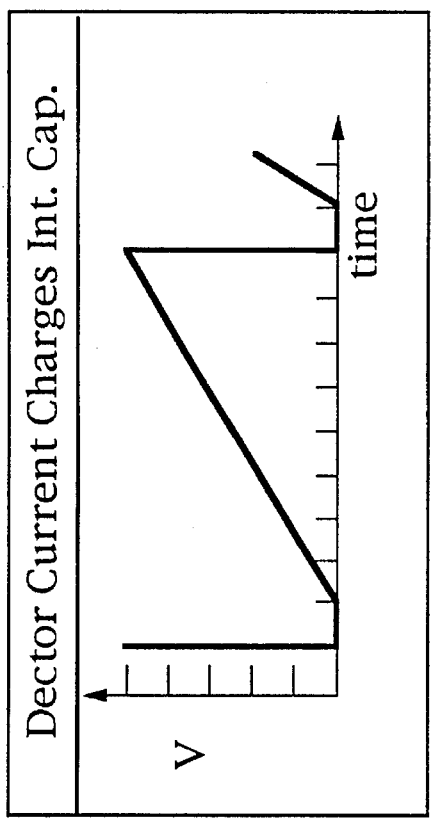
FIG. 5B.
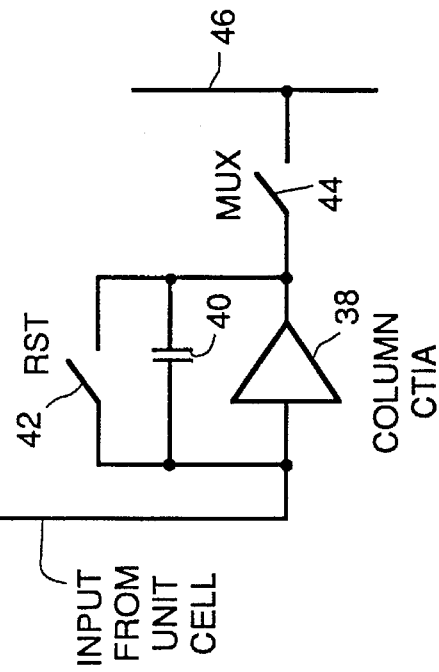
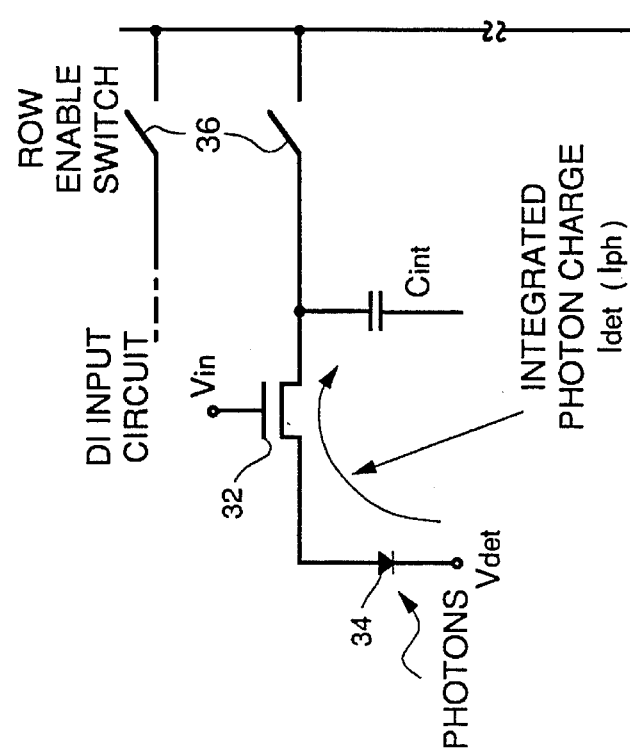
FIG. 5A.

STARING IR-FPA WITH ON-FPA ADAPTIVE DYNAMIC RANGE CONTROL ELECTRONICS

FIELD OF THE INVENTION

This invention relates generally to sensors of electromagnetic radiation and, in particular, relates to focal plane arrays (FPAs) comprised of detectors responsive to infrared (IR) radiation.

BACKGROUND OF THE INVENTION

A staring IR-FPA array is an array of radiation detectors that views a scene of interest and that detects thermal (IR) radiation arriving from the scene. This is in contrast to a scanned array wherein incident radiation is scanned over the array through the use of, by example, a rotating mirror. Modern second-generation staring IR-FPA's are capable of providing extremely high dynamic range levels. However, systems that incorporate such sensors can experience a difficulty in realizing the full extent of the IR-FPA's performance. Two main factors that have limited the full realization of the IR-FPA performance are: (a) the system Analog-to-Digital Converter (ADC); and (b) the spatial fixed pattern noise.

The system ADC is used to convert the analog output of each detector unit cell or pixel of the IR-FPA to a digital signal. However, the system ADC is generally limited in resolution (number of output bits) and in conversion speed by power and space constraints. Furthermore, non-uniformities in the IR-FPA output signal limit the ability of a low resolution ADC to capture the IR-FPA's instantaneous dynamic range. In addition, system drift and other effects can introduce spatial non-uniformities in the IR-FPA output. The spatial non-uniformities degrade the image quality, and can dominate the sensitivity of the IR-FPA system.

By example, some currently implemented imaging systems can have as much as 50% of the available instantaneous output range occupied with spatial non-uniformities in the output signal. The desired signal containing usable information sits atop a signal pedestal, and is typically less than 1/100 the size of the pedestal. As a result, such systems require an extremely high resolution (e.g., 14 bits or more) ADC to resolve the usable signal information. As is well known, high resolution ADCs are expensive and consume a significant amount of system power. The high power consumption can make the placement of the ADC at or near a cold focal plane impractical.

FIG. 1A illustrates the full range of charge capability at several stages (unit cell, column, ADC) of the signal path for a conventional IR-FPA with a direct-injection (DI) unit cell and a column-based capacitive transimpedance amplifier (CTIA). As is illustrated, such arrays provide noise levels as low as 700 e- rms at the output and full signal level to $5 \times 10^7$ carriers (input referred). This places a resolution requirement on the system's ADC that is in excess of 16-bits in order to capture the full dynamic range of the IR-FPA. The high data rates required by these arrays furthermore makes it impractical to implement 16-bit ADCs in most systems; thus 12-bit to 14-bit ADCs are most commonly used.

The spatial non-uniformity in the IR-FPA output signal is typically a result of physical effects in the detector itself and/or in associated readout array, such as $R_oA$ non-uniformities and input offset voltage variations. The non-uniformity can also be a result of system effects, such as undesirable thermal radiation received from the system environment, and scene effects, such as a contrast between the horizon and the terrain. As such, it is often difficult or impossible to remove a significant portion of the spatial non-uniformity by only detector and/or system engineering.

OBJECTS OF THE INVENTION

A first object of this invention is to provide a circuit implementation for accomplishing on-FPA per-pixel adaptive dynamic range control.

A second object of this invention is to provide a circuit implementation for accomplishing on-FPA per-pixel two point correction (gain and offset).

A third object of this invention is to provide a circuit implementation for accomplishing on-FPA per-pixel pedestal suppression.

A fourth object of this invention is to provide a circuit implementation for providing on-FPA dynamic range control, that when used in conjunction with an ADC that is located at or near a cold focal plane, enables a lower power, lower resolution, and physically smaller ADC to be used, thereby achieving benefits resulting from a reduction in interface complexity and heat load, and an increase in available space for other circuit elements.

SUMMARY OF THE INVENTION

The foregoing and other problems are overcome and the objects of the invention are realized by a circuit architecture that enables an IR-FPA to achieve a higher dynamic range. The circuit architecture significantly reduces a resolution required for an ADC that converts the analog output signals of the IR-FPA to a digital representation. In a preferred embodiment of this invention a column CTIA readout integrated circuit architecture is used in conjunction with the adaptive feedback circuitry of this invention to provide pedestal suppression on a per-pixel basis for an IR-FPA. The use of the circuitry of this invention modifies the conventional column CTIA amplifier configuration to a configuration having an auto-zeroed charge ratioed gain stage.

The circuit architecture provides adaptive feedback to the IR-FPA for achieving unit cell charge pedestal suppression. One advantage to this technique is that by suppressing the charge pedestal, the usable signal output from the IR-FPA can be brought off of a readout integrated circuit at a much higher gain. As a result, the ADC requires fewer bits to resolve the useable signal information and dynamic range.

The teaching of this invention can be beneficially applied to all staring IR-FPA applications and systems, both cooled and uncooled. The teaching of this invention can also be employed to advantage in scanned IR-FPA embodiments, such as Time, Delay and Integrate (TDI) embodiments. The teaching of this invention enables an IR radiation imaging system to feedback, in real-time, system determined correction coefficient values to the IR-FPA for per-pixel offset and gain processing, to mitigate bad pixels, and to control the IR-FPA dynamic range. This enables adaptive dynamic range and non-uniformity control prior to the ADC stage.

The use of this invention allows the optimization of the staring IR-FPA system scene-based non-uniformity correction algorithm information, and provides a return path to the IR-FPA that results in a spatial compression of the IR-FPA signal internal to the IR-FPA. One advantage inherent in this approach is that the required instantaneous dynamic range of the ADC is reduced, resulting in a reduction in ADC resolution requirements or an increase in dynamic range.

The teaching of this invention, by relaxing the ADC resolution and power consumption requirements, thus further makes practical and facilitates the integration of the ADC at a cold focal plane.

BRIEF DESCRIPTION OF THE DRAWINGS

The above set forth and other features of the invention are made more apparent in the ensuing Detailed Description of the Invention when read in conjunction with the attached Drawings, wherein:

FIG. 1A graphically illustrates a dynamic range mapping from a conventional IR-FPA unit cell to an ADC;

FIG. 1B illustrates, in accordance with an aspect of this invention, an ADC effective dynamic range referenced to an output of the FPA, wherein the LSB of the ADC is matched to the noise floor of the ADC;

FIG. 2 is a block diagram illustrating the adaptive IR-FPA architecture of this invention with a closed loop compensation path from a systems-level non-uniformity correction (NUC) algorithm and hardware;

FIG. 5A illustrates a conventional column-based capacitive transimpedance amplifier (CTIA) architecture, while FIG. 5B illustrates an exemplary capacitor charging waveform;

DETAILED DESCRIPTION OF THE INVENTION

Figure 3:
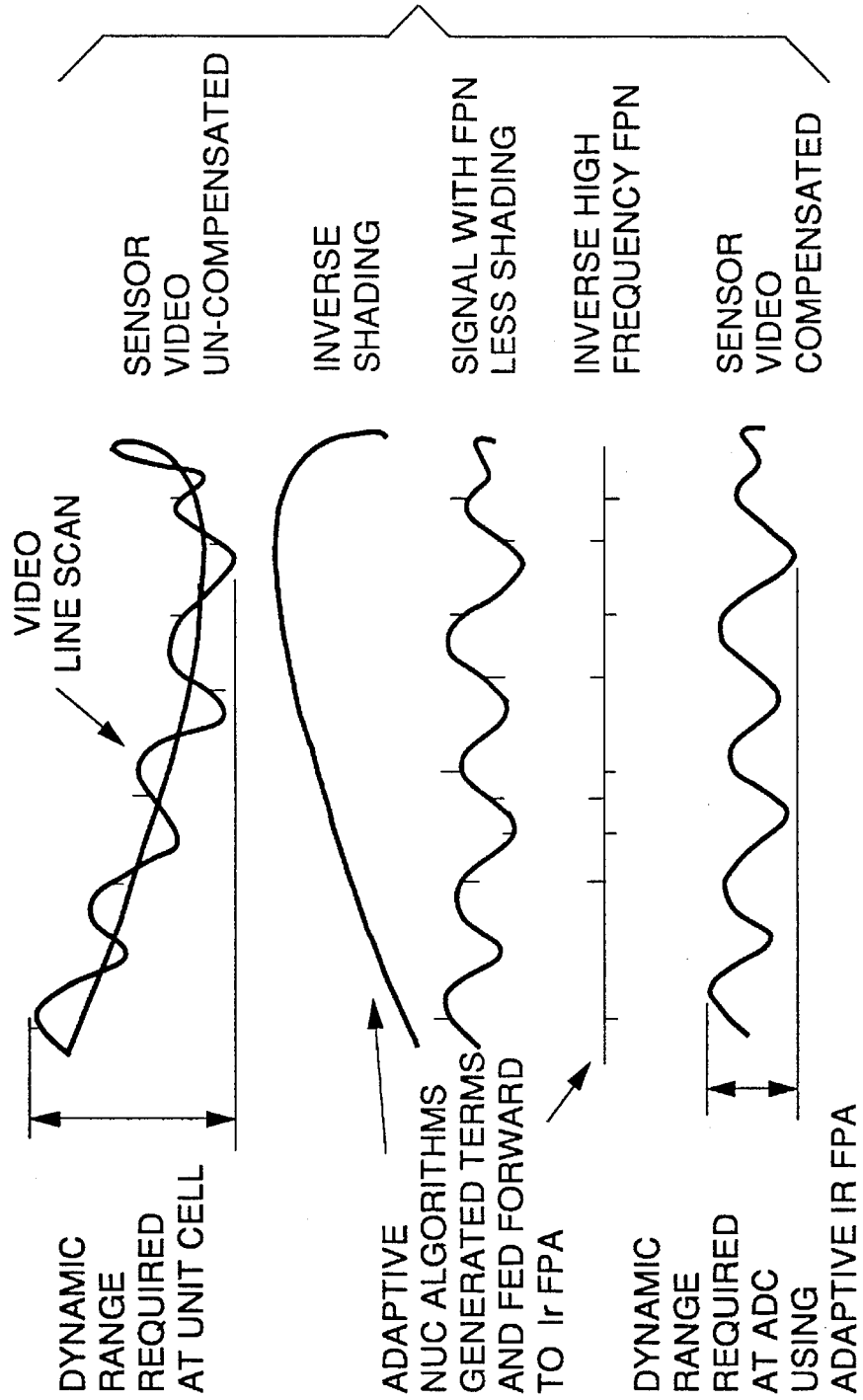
FIG. 3 graphically illustrates the removal of high frequency and low frequency spatial noise and the resulting optimization of the instantaneous dynamic range for the system ADC.

The teaching of this invention, in general, is applicable to a two dimensional staring IF-FPA, wherein the Adaptive Dynamic Range Enhancement process occurs on a per-pixel basis at the pixel rate, thus providing a capability for a system controlled spatial compression of the image data on-FPA at the frame rate of the IR-FPA. The per-pixel gain programming results in an increased dynamic range.

In accordance with this invention, the full range capability of a 12-bit ADC is shown in FIG. 1B, where the least significant bit (LSB) of the ADC is set to the noise floor of the FPA. In conventional FPA systems (referring to FIG. 1A) a globally applied system offset and gain function might be used to move this window up and down to cover the dynamic range of the FPA. However, array spatial non-uniformities (pattern noise) and spatial signal limit the ability of the system to perform this function. In accordance with this invention the individual pixels of the array can be separately compensated for gain and offset, in real-time, and thus make the use of a lower resolution (e.g., 12-bit) ADC feasible.

FIG. 2 is a block diagram that illustrates an exemplary imaging system 1 that includes the ADRE IR-FPA 10 of this invention. Incoming IR radiation (designated as $\lambda$) from a scene is converted by the pixels (photodetector unit cells) of the ADRE IR-FPA 10 to charge signals having magnitudes that are a function of the incident IR radiation intensity at each pixel. As was previously described, the magnitude of the charge signals is also a function of other effects, including environmental and system effects. In FIG. 2 the output of the ADRE IR-FPA 10 is a digital signal generated by an on-FPA or external ADC that converts voltage potentials, generated in response to the charge signals, to corresponding digital signals. The imaging system 1 further includes system components 12, comprised of a gain and offset look-up table 14, a spatial filter 16, a temporal filter 18, and an associated adaptive gain and offset memory 20. In accordance with an aspect of this invention the output of the temporal filter 18 is fed back to the ADRE IR-FPA 10 as a control loop to provide both gain and offset corrections on a per-pixel basis, in accordance with information maintained by the adaptive gain and offset LUT 20.

The content of the gain and offset look-up table 14 may be factory stored non-linear uniformity correction values that are derived during the test and characterization of the IR-FPA 10. When addressed by a particular digital value that is output by the IR-FPA 10, the look-up table 14 outputs a corresponding digital value that includes the predetermined non-linearity correction. The output of the look-up table 14 forms a stream of compensated video information.

The use of the ADRE IR-FPA 10 in the system 1 enables a a wide variety of adaptive processing functions to be performed. These include, but are not limited to, adaptive Dynamic Range Control (DRC), scene-based NUC, and imaging difference algorithms. The use of the ADRE IR-FPA 10, in conjunction with the system algorithms, may also be employed to reduce the requirements on the instantaneous dynamic range of the system ADC.

FIG. 2 illustrates in particular one possible system configuration for performing scene based NUC (SB-NUC). The control path output by the system components 12 feeds back information directly to the IR-FPA 10. That is, individual pixel data from the compensated video stream is spatially filtered, and is then temporally filtered in cooperation with the values in the look-up table 20. The result is an adaptive control of the pixel data in real-time.

In a conventional system this information may be fed back instead into the output digital data stream (post-ADC), thus placing high instantaneous dynamic range requirements on the ADC.

In accordance with an aspect of this invention the capability to process offset and gain corrections in real time and on a per-pixel basis improves the ability of the ADC to capture the dynamic range of a staring IR-FPA.

FIG. 3a illustrates a typical output waveform for an IR-FPA system. Here the system components for the output signal are separated and are shown independently. The composite signal can be seen to contain low-spatial frequency (designated LSF) and high-spatial frequency (designated HSF) fixed pattern noise (FPN) components. Low frequency effects, caused by system's optical effects, can impose high instantaneous dynamic range requirements on the system ADC.

FIG. 3b illustrates the compensating signals generated by adaptive system-level NUC algorithms (e.g., inverse shading and inverse high frequency FPN).

FIG. 3c illustrates the effect of feeding back the compensating signals (gain and offset) of FIG. 3b into the ADRE IR-FPA in accordance with this invention. One beneficial effect that is readily apparent in FIG. 3c is the significant reduction in the required dynamic range of the system ADC. The improvements in ADC instantaneous dynamic range is afforded by the ability of the system 1 to map the available IR-FPA signal into the dynamic range of the system ADC. The ability to provide offset on a per-pixel basis enables both on-FPA or off-FPA gain to be applied prior to the ADC.

Figure 4:
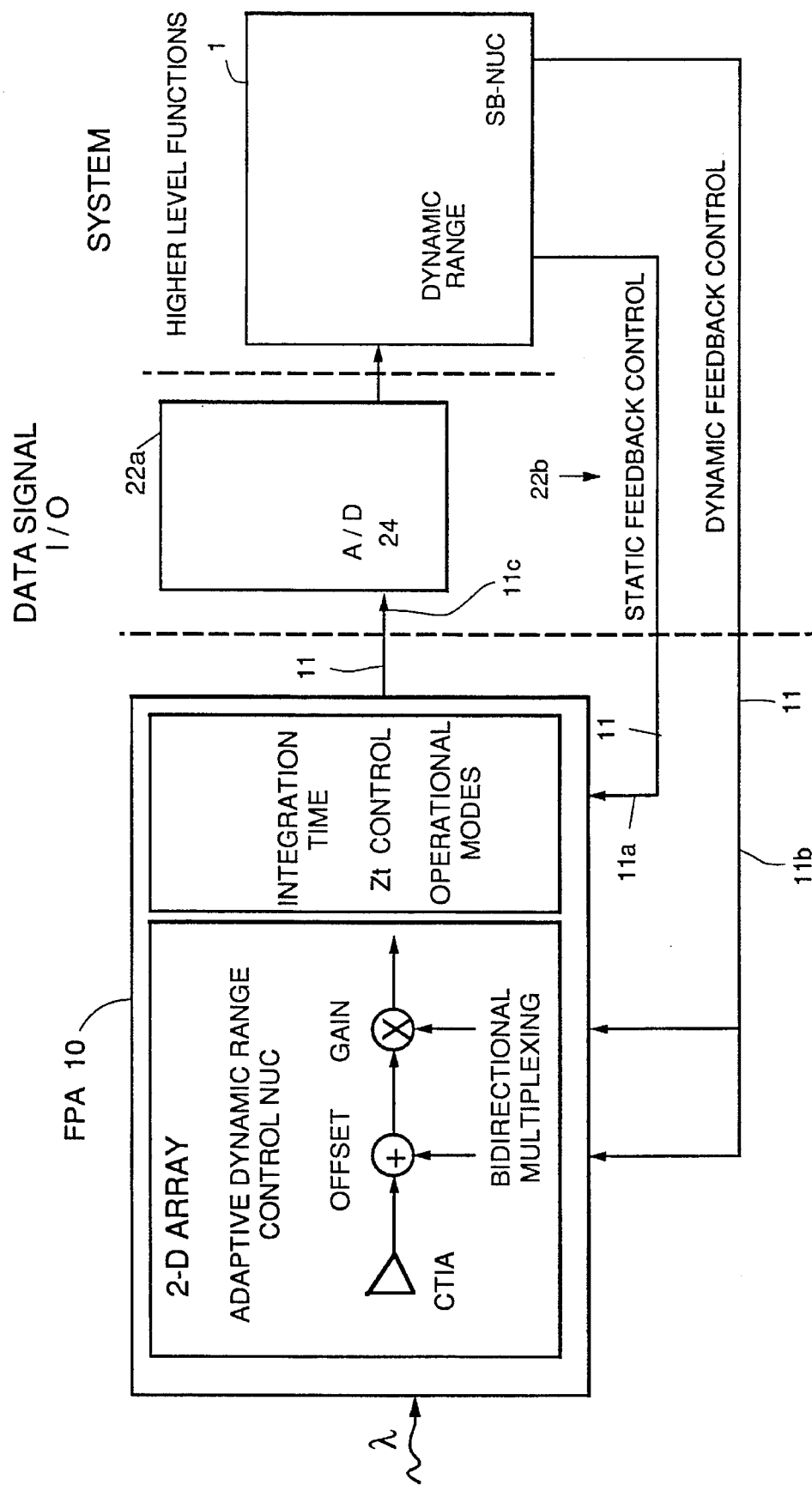
FIG. 4 is a block diagram that illustrates an Adaptive Dynamic Range Enhanced (ADRE) IR-FPA and systems interface in accordance with this invention.

Reference is now made to FIG. 4 for illustrating in greater detail the two-dimensional ADRE IR-FPA 10, an I/O interface 22 that includes a data signal I/O portion 22a (including an ADC 24) and a control I/O portion 22b. The data signal I/O portion 11c feeds multiplexed scene data to the imaging system 1, while the control I/O portion 22b receives static and dynamic feedback (11a, 11b, respectively) from the imaging system 1. The system 1 typically provides a number of higher level functions such as image segmentation, feature extraction, clutter rejection, object recognition, velocity determination, and target identification. A bidirectional multiplexer bus 11 includes feedback loop portions 11a and 11b. The conventional static feedback control loop 11a typically controls integration times, Zt (transimpedance), and operational modes of the array 10. In accordance with this invention, the dynamic feedback control loop 11b is provided to control, on a multiplexed, pixel-by-pixel basis, both the gain and offset of individual pixels of the array 10. The dynamic feedback control loop coefficients are de-multiplexed on the ADRE IR-FPA 10 (i.e., on-chip) and the output signal 11c is multiplexed off-chip.

The bus 11 also includes the output signals 11c that are multiplexed from the individual unit cells of the array, hence the bus is referred to a "bidirectional" multiplexed bus.

Various suitable types of higher level functions that can be performed by the system 1 are disclosed in, by example, U.S. Pat. No. 5,323,334, "Sensor System Having Nonuniformity Suppression With Image Preservation", by F. J. Meyers et al.; U.S Pat. No. 4,975,864, "Scene Based Nonuniformity Compensation for Staring Focal Plane Arrays", by R. Sendall et al.; and U.S. Pat. No. 4,220,967, "Scene Tracker Using Multiple Independent Correlators", by L. F. Ichida et al., the disclosures of which are incorporated by reference herein in their entireties. By example, FIG. 4 illustrates in particular one suitable embodiment for implementing the techniques disclosed in U.S. Pat. No. 4,975,864, wherein the detector non-uniformity compensation terms are instead fed-back to the IR-FPA 10 in a closed loop manner.

FIG. 5A illustrates a conventional Direct Injection (DI) input and column CTIA 38. A DI input circuit 32 buffers the injection of holes from a p-on-n photovoltaic detector 34. Charge is integrated in the storage well of a capacitor, Gint. This charge is read out of the unit cell by closing a row enable switch 36 and creating a conduction path to the input of the column CTIA 38. The change of charge state acts to debias the CTIA 38 and derives the CTIA's output with inverting gain. The net result is that the unit cell charge is pulled across the feedback capacitor 40 of the column CTIA 38. As is indicated in FIG. 5B, the voltage that appears at the CTIA output is a function of the value of the feedback capacitor 40 and the quantity of charge from the unit cell. The input charge to output voltage ratio is, therefore, controlled by the size of the column CTIA's feedback capacitor 40. A reset switch (RST) 42 is provided for periodically equilibrating the charge across the feedback capacitor 40, and a multiplexer switch 44 is provided for periodically coupling the column CTIA output to an output bus 46.

Reference in this regard may be had to U.S. Pat. No. 4,786,831, issued Nov. 22, 1988 to A. L. Morse et al., entitled "Integrating Capacitively Coupled Transimpedance Amplifier", for further details of the operation of the CTIA 38.

Figure 6:
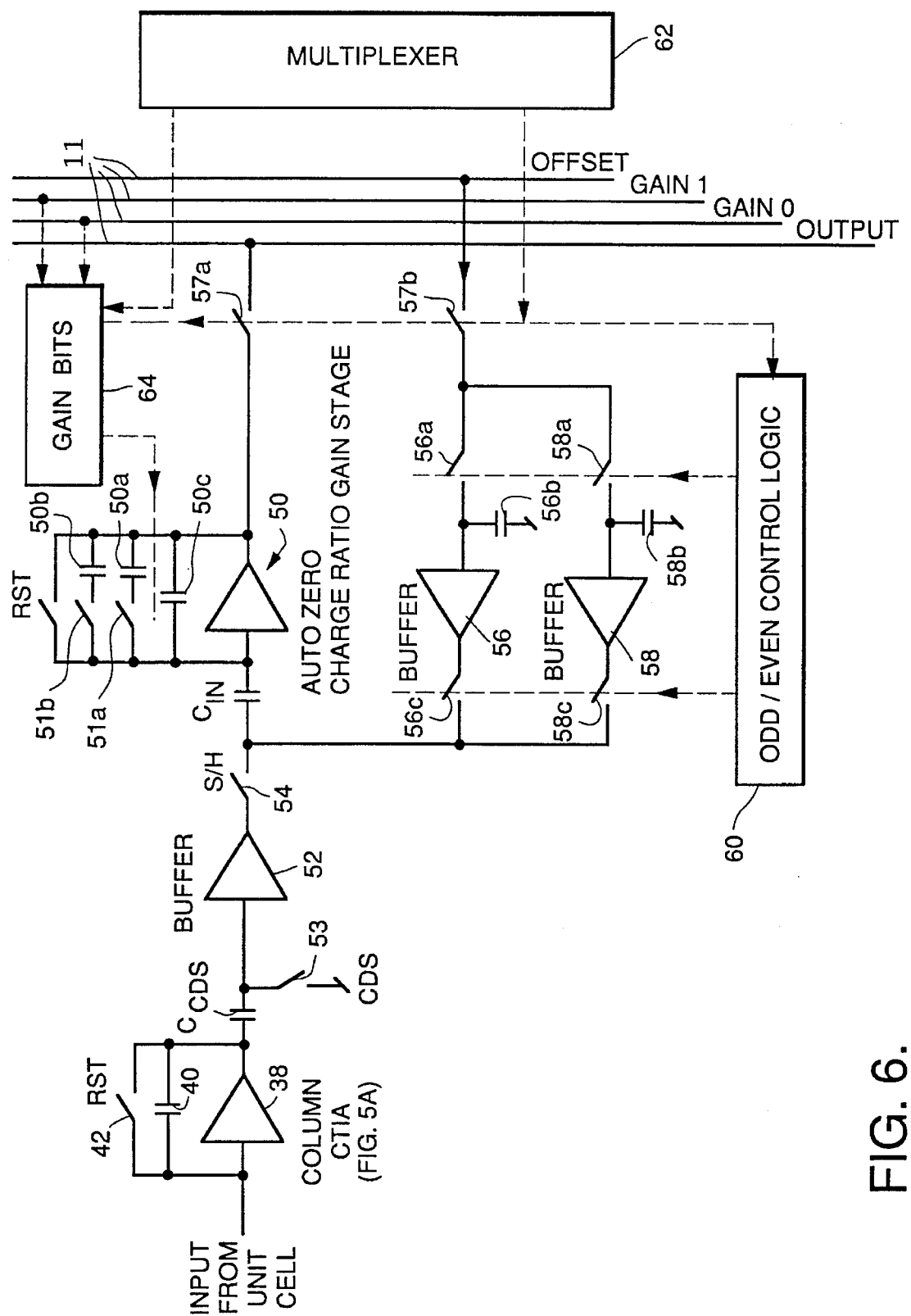
FIG. 6 illustrates the ADRE IR-FPA circuitry of this invention when interfaced to the output of the CTIA of FIG. 5A.

FIG. 6 illustrates in greater detail the ADRE IR-FPA 10. The column CTIA 38 of FIG. 5A is employed to collect photo-induced charge from the unit cell, and a known type of correlated double sampler (CDS) comprised of a switch 53 and a capacitance $C_{CDS}$ is optionally used to correlate the CTIA's KTC noise and to remove parasitic offsets. In accordance with this invention an auto-zeroed charge ratio gain (AZCRG) stage 50 is provided at the output of the column CTIA 38, via an optional buffer 52, sample and hold (S/H) switch 54, and an input capacitance Cin. Cin functions to convert the output potential of buffer 52 to a charge at the input to the AZCRG stage 50. The AZCRG stage 50 performs gain and offset signal processing for the signal output from the column CTIA 38. Two offset signal buffers 56 and 58 alternately drive the auto-zero input of the AZCRG stage 50 to provide offset correction. A gain bit register (shown as the block 64) facilitates the operation of the gain compensation function. The buffers 56 and 58 are loaded and enabled using an odd/even row or line controller 60, via load switches 57b, 56a and 58a. Controller 60 in turn is triggered by an output multiplexer 62. The odd and even controller 60 is employed to control the loading of potentials corresponding to desired correction coefficients for a next pixel onto one of holding capacitors 56b and 58b for the odd and even rows of unit cells, respectively, and to simultaneously readout, via switch 57a, the signal from a current pixel. Programmed information for both gain and offset is thus loaded simultaneously with the readout process and refreshed on a per-row basis.

Figure 10:
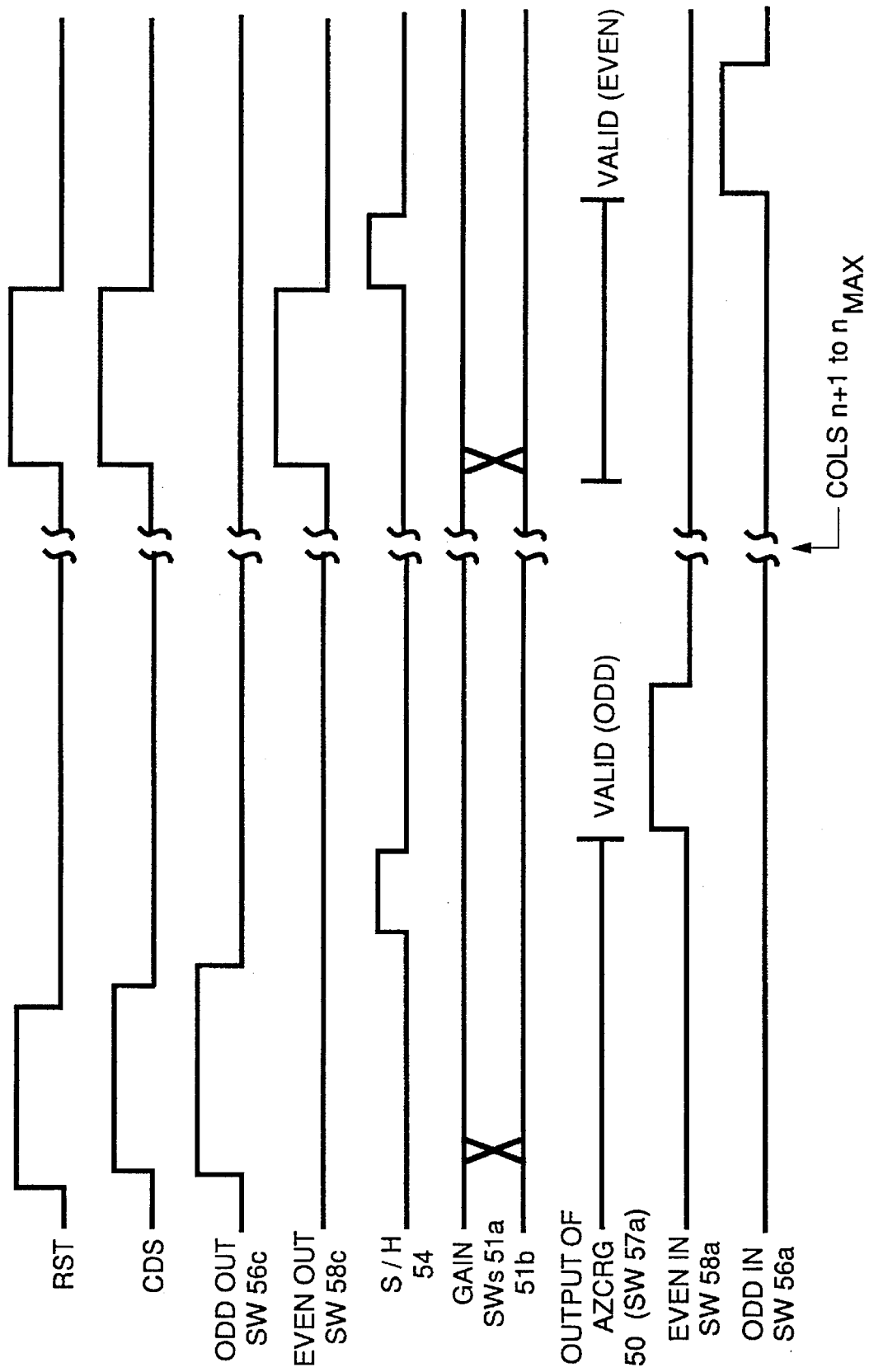
FIG. 10 is a timing diagram that illustrates the operation of the circuit of FIG. 6.

Referring now also to FIG. 10, the two sampled offset-stages 56 and 58 are buffered back to the auto-zero input of the AZCRG stage 50 via output switches 56c and 58c. In FIG. 10 a high value is assumed to close the associated switch. By example, odd row in switch 56a is opened and even row in switch 58a is closed while odd row pixel data is coupled from the output of the AZCRG 50 to the bus 11. During this time a next even row offset correction potential is being stored onto capacitor 58b through the closed switch 58a. Previously, the stored potential on the capacitor 56a was coupled through buffer 56 and the closed switch 56c, and was used to auto-zero the AZCRG stage 50.

The gain bits block 64 is employed to provide a controlled gain to the AZCRG 50 by selectively paralleling, by example, one or two additional capacitances (50a, 50b) with a feedback capacitance 50c of the AZCRG 50. This is accomplished by loading gain bits 64 in synchronism with the odd/even row offset correction applied from buffers 56 and 58. The gain bits 64 are latched in switches 51a and 51b during the subsequent reset period. As more capacitance is added to the feedback path of the AZCRG 50 the gain is reduced proportionately. Although two gain bits, and hence two capacitors 50a and 50b, are shown in FIG. 6, it should be realized that more or less than this number can be used. As more parallel capacitances are provided finer control over the gain of the AZCRG 50 is made possible (i.e., increased gain resolution is realized).

It should be realized that the circuitry shown in FIG. 6 is duplicated for each column of the IR-FPA. As such, as each column CTIA 38 is outputting a potential that corresponds to the charge accumulated within one unit cell, all unit cell (pixel) outputs of a selected row (odd or even) are being simultaneously offset and gain corrected by the associated AZCRG stages 50. A like number of ADCs can be provided for then converting the pedestal corrected pixel outputs to corresponding digital values. Otherwise, some lesser number of ADCs can be provided, and the multiplexer 62 employed for sequentially applying corrected pixel outputs to the ADC input.

The circuitry illustrated in FIG. 6 shows the use of offset correction circuitry referenced to offset values being sampled from an analog signal provided by the system 1 on the dynamic feedback bus 11b (FIG. 4). This approach enables up to 16-bit resolution in the control of the AZCRG stage 50. The gain stage 64 allows for a binary number of fixed gain values to be provided for the AZCRG stage 50.

As was previously stated, the ADRE IR-FPA circuitry illustrated in FIG. 6 is preferably implemented at the column level of the FPA, and is fully capable of performing per-pixel correction operations. At least two significant advantages are realized by the this approach. First, the surface of the FPA integrated circuit that is used to support the on-FPA adaptive functions is shared at the row-level. This increases the surface area that is available for the unit cell and charge well capacity. An additional unit cell capacity can be employed to allow the use of lower input impedance input amplifiers, which can be an important consideration in that the unit cell performance is often a major factor in establishing low spatial noise levels and high dynamic range. A second advantage this that the column-based ADRE architecture of this invention is compatible with conventional and well characterized DI, Feedback Enhanced DI (FEDI), and CTIA unit cell configurations and, as such, does not require any changes to the basic unit cell construction.

Figure 7:
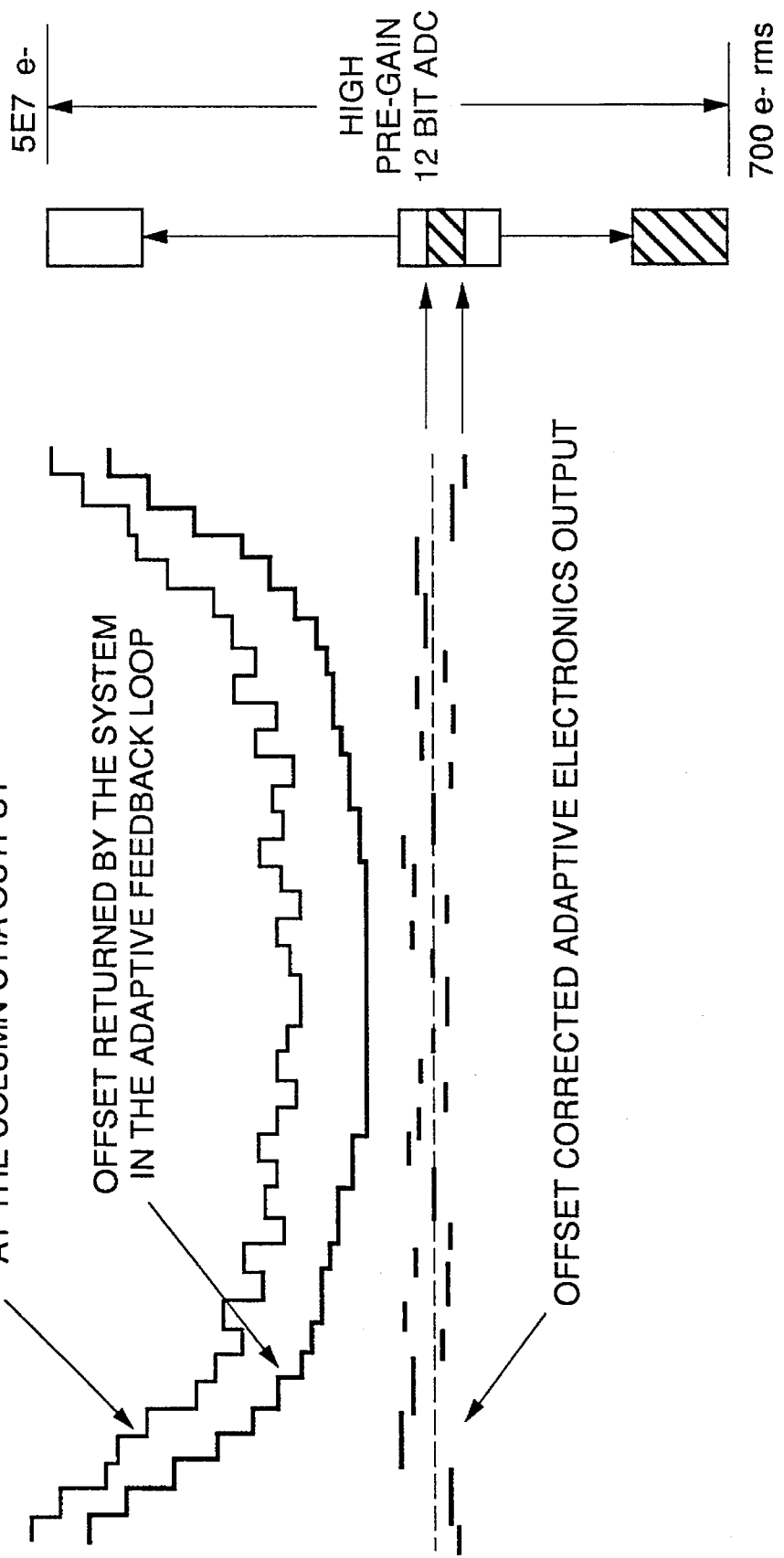
FIG. 7 illustrates an adaptive feedback offset process in accordance with this invention, when used in the context of a staring IR-FPA.

FIG. 7 illustrates the adaptive feedback offset process in the context of a staring IR-FPA. Here, the uncorrected signal (upper trace) is illustrated as it appears at the output of the unit cell and column CTIA. This signal shows a large spatial non-uniformity such as that known to be caused by cosine-to-the-fourth vignetting effects. In accordance with this invention, and as is illustrated in the middle trace, system-derived offset values for dynamic range compensation are shown returned to the offset stage (buffers 56, 58 and associated switches) of the AZCRG stage 50. The resulting offset-corrected ADRE output is shown as the lower trace with respect to the dynamic range of the ADC 24 of FIG. 4. As should be apparent, as a result of the operation of the ADRE circuitry a, by example, 12-bit ADC can be used to capture the 16-bit dynamic range of the IR-FPA.

Figure 8:
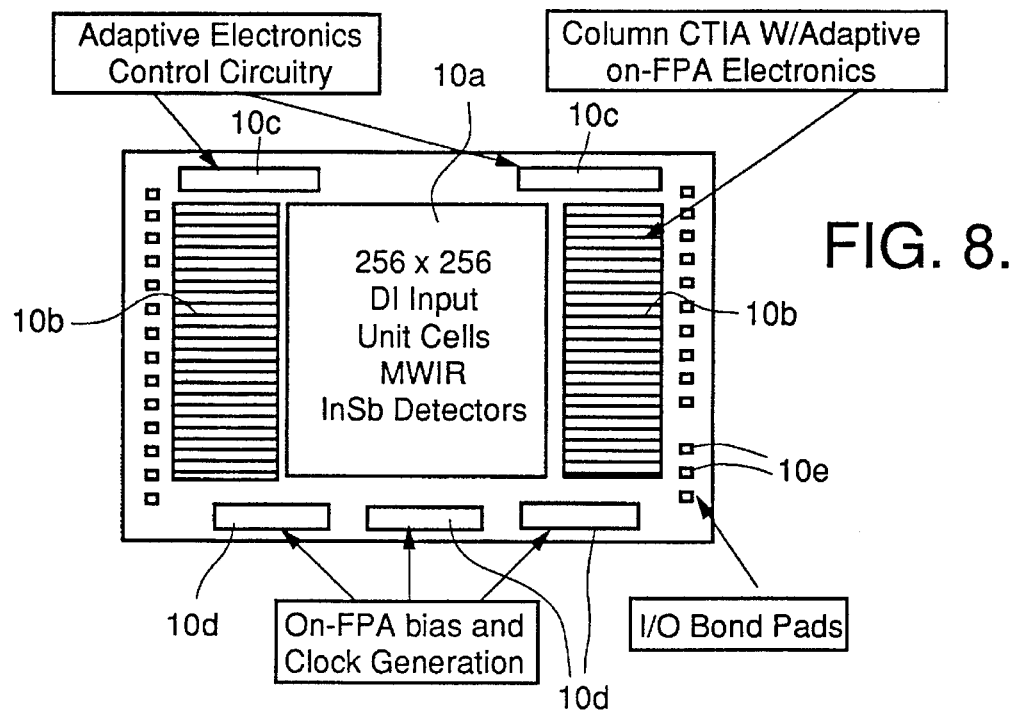
FIG. 8 is a simplified and enlarged top view of an exemplary ADRE IR-FPA integrated circuit.

An exemplary layout the ADRE IR-FPA 10 integrated circuit is shown in FIG. 8. The major portion of the integrated circuit area is taken up by a 256×256 array 10a of MWIR-responsive InSb unit cells containing the DI input circuit and an integration capacitor. The column CTIA's with the offset and gain processing circuitry in accordance with this invention are located at opposite ends of the array 10a, along with each column amplifier, in the blocks labelled 10b. On-FPA ADRE control circuits, such as the odd/even control logic 60, are located in the blocks labeled 10c. Conventional on-array bias and clock circuits are shown in the blocks labelled 10d, and conventional I/O bond pads 10e are located at a periphery of the integrated circuit.

Figure 9:
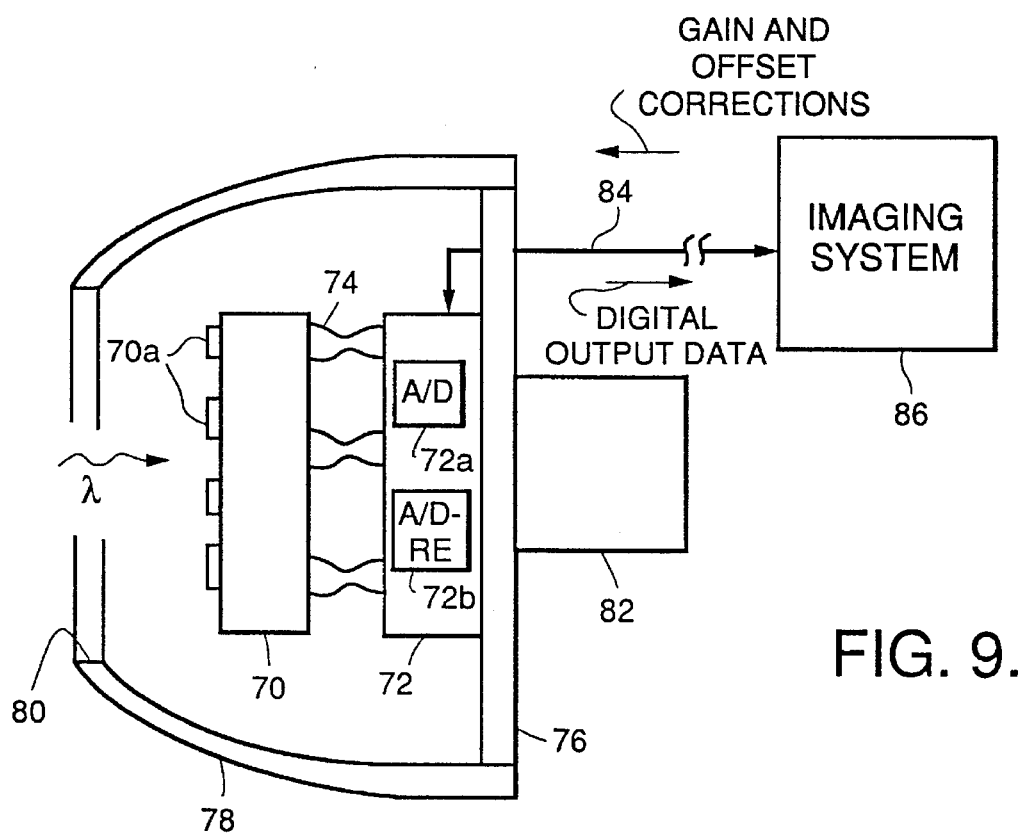
FIG. 9 is a simplified cross-sectional view, not to scale, of an embodiment of an imaging system in accordance with this invention.

FIG. 9 illustrates an embodiment of this invention wherein a Group II–VI (e.g., HgCdTe) two-dimensional area array 70, having individual photodetector unit cells 70a, is hybridized with an attached readout integrated circuit 72. In this case the interface between the array 70 and the readout integrated circuit 72 is made by indium bumps 74. The hybridized detector/readout structure is mounted to a cold stage 76 at or near the focal plane of an IR radiation imaging system. A warm or cold shield 78 has an entrance aperture 80 for admitting IR radiation from a scene of interest. A conventional cryogenic cooler 82, such as a cold finger or a thermionic cooler, is provided to maintain the cold stage 76 and array 70 at a desired operating temperature. Cabling, shown generally as 84, connects the hybridized detector/readout structure to an imaging system 86, wherein high level image processing and other functions are performed as described previously.

In this embodiment of the invention at least one ADC 72a is integrated onto the readout integrated circuit 72, along with CTIAs 38 and the per-column ADRE circuitry 72b illustrated in FIG. 6. Image-related data is digitized by the ADC 72a and is output to the imaging system 86. The adaptive closed loop gain and offset corrections are generated within the imaging system 86 and are output to the ADRE circuitry 72b via the cabling 84.

In accordance with this invention the ADC 72a has a reduced resolution over what would be required if the ADRE circuitry were not employed (e.g., 12-bits versus 16-bits). This results in a significant reduction in the complexity and operating power of the ADC 72a, making practical its integration within the readout integrated circuit 72 and its placement within the cold stage.

Although described generally in the context of Group II–VI IR radiation staring detector arrays, it should be realized that the teaching of this invention is applicable to electromagnetic radiation detector arrays in general, such as Si-based visible detectors, and is further applicable to scanned arrays of detectors.

Thus, while the invention has been particularly shown and described with respect to preferred embodiments thereof, it will be understood by those skilled in the art that changes in form and details may be made therein without departing from the scope and spirit of the invention.

What is claimed is:

1. An imaging device having a plurality of electromagnetic radiation detector unit cells each of which outputs an electrical signal having a magnitude that is a function of an amount of electromagnetic radiation that is detected by the unit cell, comprising:

a plurality of amplifier means individual ones of which have an input that is switchably coupled to individual ones of a plurality of said unit cells for receiving said electrical signals therefrom; each of said amplifier means including, first circuit means, having inputs coupled to a source of gain correction values, for selectively setting a gain of said amplifier means for each of said plurality of unit cells that are switchably coupled to said input of said amplifier means; and second circuit means, having inputs coupled to a source of offset correction values, for selectively setting an offset potential that said amplifier means subtracts from each of said electrical signals that are output by said plurality of unit cells that are switchably coupled to said input of said amplifier means.

2. An imaging device as set forth in claim 1, wherein said amplifier means, said first circuit means, and said second circuit means comprise an auto-zeroed charge ratioed gain stage.

3. An imaging device as set forth in claim 1 wherein each of said electrical signals is comprised of a pedestal signal component and a desired signal component that rides on said pedestal signal component, and wherein a magnitude of said offset potential is approximately equal to a magnitude of said pedestal signal component.

4. An imaging device as set forth in claim 1 wherein said plurality of amplifier means are integrated upon a common substrate with said plurality of unit cells.

5. An imaging device as set forth in claim 1 wherein said plurality of unit cells are formed upon a first substrate, wherein said plurality of amplifier means are formed upon a second substrate, and wherein said first substrate is hybridized with said second substrate.

6. An imaging device as set forth in claim 1, and further comprising interface means for coupling an output of said amplifier means out of said device and for inputting a gain correction value and an offset correction value to said device.

7. An imaging system, comprising:

a system controller;

a two-dimensional array of radiation detectors organized as m rows and n columns, each column having a capacitively coupled transimpedance amplifier (CTIA) coupled thereto for converting a charge output by individual ones of the m radiation detectors of the column to a potential;

an auto-zero charge ratioed gain stages each having an input coupled to an output of one of said CTIAs, each of said gain stages being coupled to said system controller for receiving gain correction values and offset correction values therefrom, each of said gain stages being responsive to a potential output by said CTIA for a predetermined one of the m radiation detectors of the column for modifying said potential in accordance with a gain correction value and an offset correction value received from said system controller; and an analog-to-digital converter (ADC) having an input coupled to an output of at least one of said gain stages for converting said modified potentials to a digital equivalent value, and for providing said digital equivalent values to said system controller.

8. An imaging system as set forth in claim 7 wherein said system controller calculates said gain correction values and said offset correction values in accordance with said digital equivalent values so as to provide closed-loop control over a magnitude of said modified potentials.

9. An imaging system as set forth in claim 7 wherein said two-dimensional array is cooled to an operating temperature during use and is located at a cold stage of said imaging system, and wherein said at least one ADC is also located at said cold stage.

10. An imaging system as set forth in claim 7 wherein said potential output by each of said CTIAs is comprised of a pedestal signal component and a desired signal component that rides on said pedestal signal component, and wherein said offset correction value is selected to cause said gain stage to subtract an offset potential from said CTIA output potential that is approximately equal to a magnitude of said pedestal signal component.

11. An imaging system as set forth in claim 10 wherein said ADC has a number of bits of resolution that is selected for expressing substantially only the desired signal component, and not the pedestal signal component plus the desired signal component.

12. A method for operating an array of radiation detectors, comprising the steps of:

reading out uncompensated electrical signals from individual ones of the radiation detectors, the uncompensated electrical signals being generated at least partially in response to incident electromagnetic radiation;

for each read-out uncompensated electrical signal, applying a gain correction and an offset correction to the read-out electrical signal in accordance with an associated gain correction value and an associated offset correction value, respectively;

outputting a gain and offset compensated electrical signal; and during the step of outputting, inputting and storing a gain correction value and an offset correction value for another radiation detector.

13. A method as set forth in claim 12 and further comprising a step of converting the outputted gain and offset compensated electrical signal to a digital equivalent signal.

14. A method as set forth in claim 13 wherein the step of converting is accomplished with a number of bits of resolution that is sufficient for expressing a magnitude of the gain and offset compensated electrical signal, but not a magnitude of the uncompensated electrical signal.

15. A method as set forth in claim 12 wherein the array of radiation detectors are organized as a two dimensional array of n rows and m columns, and wherein the step of reading out reads out the uncompensated electrical signals on a row-by-row basis and, for each row, by each column within a row.

* * * * *